United States Patent

Decker et al.

[11] Patent Number: 5,998,560
[45] Date of Patent: Dec. 7, 1999

[54] COATING POWDER FOR HIGH TEMPERATURE RESISTANT COATINGS

[75] Inventors: Owen H. Decker, Wyomissing; Charles P. Tarnoski, Sinking Spring, both of Pa.

[73] Assignee: Morton International, Inc., Chicago, Ill.

[21] Appl. No.: 09/126,186

[22] Filed: Jul. 30, 1998

Related U.S. Application Data

[63] Continuation-in-part of application No. 09/052,664, Mar. 31, 1998.

[51] Int. Cl.[6] ........................................... C08K 3/10
[52] U.S. Cl. ........................... 528/14; 524/431; 524/436; 524/441; 524/440; 524/449
[58] Field of Search ..................................... 524/413, 431, 524/436, 441, 449, 440

[56] References Cited

U.S. PATENT DOCUMENTS

| | | | |
|---|---|---|---|
| 3,862,082 | 1/1975 | Hatanaka et al. | 524/431 |
| 4,320,044 | 3/1982 | Nakamura | 524/431 |
| 5,023,295 | 6/1991 | Bosch et al. | 524/431 |

*Primary Examiner*—Melvyn I. Marquis
*Attorney, Agent, or Firm*—Wayne E. Nacker; Gerald K. White

[57] ABSTRACT

A coating powder for providing a high temperature resistance coating has a silicone resin binder system which is either substantially all silicone resin or an —OH— functional silicone resin adduct plus blocked, multi —NCO functional curative. The coating powder is pigmented with titanium dioxide which is either non-coated or coated with a sufficiently low level of an inorganic oxide such that when slurried in water, the pH is 7 or above. The coating powder preferably contains at least 40 phr mica and/or calcium metasilicate, preferably between 2 and about 20 phr aluminum. The coating powder may also contain zinc to protect the underlying substrate from corrosion and high-temperature pigments, particularly ceramic pigments.

12 Claims, No Drawings

COATING POWDER FOR HIGH TEMPERATURE RESISTANT COATINGS

This application is a Continuation-In-Part of prior U.S. application Ser. No. 09/052,664, filed Mar. 31, 1998.

The present invention is directed to powder coating using coating powders that produce heat-resistant coatings or finishes, and more particularly to coating powders based on silicone resins.

BACKGROUND OF THE INVENTION

It is known that coatings or paints incorporating silicone resins have high heat resistance. U.S. Pat. No. 5,422,396, the teachings of which are incorporated herein by reference, describes acrylic/silicone coating powders which produce coatings that withstand high temperatures. For high temperature applications, such as automotive exhaust parts, barbecue grills, stove burner elements, or the like, coating powders are desired which produce coatings that withstand even higher temperatures.

SUMMARY OF THE INVENTION

In accordance with one aspect of the invention, there is provided a coating powder consisting essentially of A) 100 parts silicone resin and B) at least about 40 parts per hundred resin by weight (phr) mica and/or calcium, preferably at least about 60 phr mica, more preferably, at least about 80 phr mica and/or silica, up to the pigment/filler loading capacity of the silicone resin.

In accordance with a second aspect of the invention, a coating powder composition consists essentially of a resin system $A^1$), which resin system $A^1$) comprises between about 60 and about 80 wt % of 1) a silicone resin adduct, between about 70 and about 90 wt % of the silicone resin adduct 1) being i) silicone resin and between about 10 and about 30 wt % of the adduct 1) being ii) an organic moiety which is adducted to the silicone resin i), at least about 90% of the available —OH groups of the silicone resin being bound to the organic moiety, which organic moiety provides —OH functionality, and the resin system $A^1$) further comprises 2) a curative having blocked, multi —NCO functionality, the curative 2) being present at an NCO:OH ratio relative to the adduct 1) between about 0.7:1.0 and about 1.5:1.0, the curative 2) comprising between about 20 and about 40 wt. % of the silicone resin adduct 1) and $B^1$) at least about 40 parts per hundred resin by weight (phr) mica and/or calcium metasilicate, preferably at least about 60 phr mica and/or calcium metasilicate, more preferably, at least about 80 phr mica and/or calcium metasilicate, up to the pigment/filler loading capacity of the resin system $A^1$).

Aluminum flake at between about 1 and about 20 phr, preferably between about 2 and about 12 phr, most preferably between about 6 and about 10 phr, may be advantageously added to either the first or the second embodiment of the invention.

Also, zinc in particulate form at up to about 300 phr, preferably at least about 10 phr, may be advantageously added to either the first or the second embodiment of the invention to prevent corrosion of the substrate to which the coating powder is applied.

In accordance with a further aspect of the invention, there is provided a white or light coating powder composition comprising silicone and between about 20 and about 150, preferably between about 40 and about 100 parts by hundred by weight based on the silicone, of titanium dioxide which is non-coated or substantially non coated with silica or alumina such that it forms a slurry that is neutral or basic.

DETAILED DESCRIPTION OF CERTAIN PREFERRED EMBODIMENTS

Herein, all percentages are by weight unless otherwise noted. The resin system includes silicone resin, or silicone resin adduct plus curative which are considered as 100 parts by weight. All other components of the coating powder are expressed as parts per hundred resin by weight (phr) relative to the resin system.

While "high temperature" is a relative term, the coating powders of the present invention are intended to withstand temperatures whereat most organic components, including organic moieties of the silicone resin, burn away. Accordingly, it is a desire that coatings of the present invention withstand, for example, temperatures of 550° C (1022° F) and upward, although end-use temperatures and other requirements of the coating powder may vary according to the particular coating application.

When exposed to air at temperatures above about 600° F. (3150C) most organic coatings are consumed in a matter of minutes. Silicone-based coating powders are also affected because the resins which go into such coatings contain organic moieties. As the organic moieties of the silicone resins oxidize away, the silicone resin shrinks; and stresses build up in the coatings that are relieved by cracking.

A resin system which is substantially all silicone resin, as in accordance with the first embodiment described above, provides stability at the highest temperatures, having only minor amounts of organic moieties and therefore minimal shrinkage as the organic moieties burn away. At temperatures of 300–500° F. (149–260° C) silicone resins self-cure their —OH functionalities reacting to evolve water and thereby build up the cross-link structure. This self-securing, however, tends to be achieved at the expense of initial film smoothness as the evolution of water tends to produce microscopic defects, such as pinholes.

Suitable silicone resins for use in the invention are discussed in "Silicones in Protective Coatings" by Lawrence H. Brown in *Treatise on Coatings* Vol. 1, Part III "Film-Forming Compositions" PP. 513–563, R.R. Meyers and J.S. Long eds. Marcel Dekker, Inc. New York, 1972, the teachings of which are incorporated herein by reference. Suitable silicone resins are also described in U.S. Patents Nos. 3,585,065 and 4,107,148, the teachings of each of which are incorporated herein by reference, as well as U.S. Patent Nos. 3,170,890 and 4,879,344 the teachings of each of which are incorporated herein by reference. The organic moieties of the silicone resins are aryl, particularly phenyl, or short chain ($C_1$-$C_4$) alkyl. For good heat-resistance, methyl and phenyl groups are the organic moieties of choice. Generally, the more phenyl groups, the higher heat-resistance provided. For forming powder coatings, the silicone resins should be solid at room temperature and preferably have a $T_g$ of at least about 45° C. Examples of such silicone resins are phenylsilicone SY-430, sold by Wacker Silicone, Conshohocken, Pa., having an average molecular wt. of about 1700, methylsilicone MK also sold by Wacker and methylphenylsilicone 6-2230 sold by Dow Corning.

For high temperature stability, silicon resins useful in the invention have c degree of substitution as described in *Silicones in Protective Coatings*, supra of about 1.5 or less, typically between about 1 and about 1.5. Specifically, degree of substitution is defined as the average number of substituent groups per silicon atom and is the summation of the mole percent multiplied by the number of substituents for each ingredient. Silicon resins are used which self-condense at high end-use temperatures, e.g., that of a barbecue grill or an automobile exhaust part. This requires siloxane functionality (Si—O—H), and silicone resins used herein have an —OH content of between about 2.0 and about 7.5 wt. % of the silicone resin.

The preferred silicone resin in the coating powder has organic substitutents selected from the group consisting of phenyl, methyl, $C_2$ through $C_6$ alkyl and mixtures thereof. The preferred silicone resin has a viscosity of between about 500 and about 10,000 cps at 150° C., preferably 2000 to 5000 cps. The preferred silicone resin has a condensable hydroxyl content of between about 2 and about 4.5 wt %, preferably from about 2 to about 3 vit. %. The preferred silicone resin has a glass transition temperature ($T_g$) of about 55° C. or above, preferably about 60° C. or above. The preferred silicone resin contains about 0.2% or less of organic solvents, preferably about 0.1% or less.

The above-recited viscosity parameters of the preferred silicone resin are desired for appropriate melt-flow of the molten coating powder at the temperatures whereat the coating powder is fused and cured.

The lower limits of $T_g$ of the preferred silicone resin recited above are desirable for preventing undue blocking of the coating powder. The tendency of a powder coating to sinter or block is an important measure of its commercial value. Minor blocking is normal for coating powders. A tendency to excessively block can make cold storage, shipping, and handling necessary. Badly blocked powder is useless and must be discarded. Blocking is measured by weighing a 1" diameter cylinder of powder 1 inch (2.54 cm) deep with 110 grams at 110° F. (43° C.) for 24 hours and evaluating the difficulty of breaking the sample back into usable powder.

A smooth textured appearance is desirable for high temperature coatings. Bubbles caused by outgassing of water and organic solvent mar the appearance of a coating. Very rough films are usually not continuous, nullifying their usefulness as protective barriers.

The condensable hydroxyl content of the silicone resin should not be too high. Otherwise, too much water outgasses during curing of the coating powder, resulting in a foamy appearance of the coating. On the other hand, below a certain condensable hydroxyl content, the coating powder will not cure or will cure too slowly to be suitable for commercial applications. The gel time of a coating powder is a measure of how fast crosslinking reactions occur, usually measured on a horizontal plate at 400° F. (204° C.). Powders which take longer than 300 seconds to gel are generally not considered reactive enough to be commercially useful.

Most commercial silicone resins contain some residual organic solvent as a consequence of the process of silicone resin synthesis. Such organic solvent tends to be internally trapped within the silicone resin and is generally not removed when the silicone resin is melt blended with other components to form a coating powder composition. Herein, it is found that it is desirable to substantially remove such residual organic solvent. This is accomplished by melting the silicone resin and removing solvent from the molten resin, e.g., by sparging with a gas, such as nitrogen, or by vacuum.

Fillers can act to reinforce silicone coatings, and herein it is found that mica filler (potassium aluminum silicate) is particularly effective, perhaps because of its plate-like form. Another very effective filler is calcium metasilicate perhaps because of its rod-like form. Generalizing, it is expected that any heat-resistant filler with one dimension at least four times larger than another would provide useful reinforcement. This would include such materials as glass and metal fibers and flake. Mixtures of mica and calcium metasilicate are similarly effective. Both α and β calcium metasilicate are useful in the invention, although the later is preferred.

Combinations of mica and/or calcium metasilicate and aluminum flakes appear better than mica and/or calcium metasilicate alone under certain conditions for providing a coating having thermal stability. While Applicants are not bound by theory, it may be that bond strength between the oxide surface of the aluminum flakes and oxidized silicone resin is especially high.

A limiting factor at the upper end for the amount of aluminum flake is that an aluminum-containing coating powder may become explosive above a threshold safety limit; thus the aluminum content must be kept below such a threshold safety limit. If the aluminum flake is incorporated within the coating powders itself it will suffer mechanical deformation, lose reflectivity, and impart greyness to the finish. Aluminum, in flake form, may also be admixed (or post-blended) with resinous coating powder and co-applied to a substrate. As a post-blended component, the aluminum flake may impart glitter to a coating; however, the threshold upper limit of aluminum flake that may be safely added as a post-blend may be lower.

A further metal particulate that may be added is zinc particulates to impart corrosion resistance to the underlying substrate. For anti-corrosion properties, zinc should be added at least about 10 phr. Zinc salts, such as zinc (acetylacetonate) e.g., at levels of about 0.1 phr and upward, will also catalyze the auto-condensation of silicone resin.

To provide desired color to the coating, pigments may be added, provided that the pigments are stable at the temperatures to which the coatings will be subjected. Particularly suitable are ceramic pigments. Some metallic pigments are suitable, but metallic pigments may discolor through oxidation or otherwise.

The coating powder may optionally, but preferably, contain a cure catalyst for the silicone resin, such as zinc acetylacetonate. Use levels for silicone cure catalyst are typically between about 0.1 and about 1 wt % relative to the total weight of resins A) plus B).

Minor components known in the art, such as flow aids to prevent chartering, may also be included in the coating powder.

In accordance with a second aspect of the invention set forth above, the resin system may include an adduct of silicone with an organic moiety which provides —OH functionality to the adduct and a blocked, multi —NCO functional curative. As such a resin system has a greater organic content than a resin system which is substantially only silicone resin, the coatings formed using such a resin system may not withstand quite as high temperatures. However, the —NCO/—OH reaction does not evolve any gases, including water, and therefore may provide a coating with a better appearance. Choice of the resin system, therefore, may depend upon the aesthetic and temperature requirements of the particular application.

The adduct is formed by reacting substantially all of the —OH groups of a silicone resin with an organic moiety that provides, after the adducting reaction, —OH groups for a subsequent curing reaction. Examples of such adducts, e.g., by adducting glycols to siloxane resins, are described in U.S. Pat. No. 4,683,271 to Lin et al., the teachings of which are incorporated herein by reference. A currently preferred glycol for adducting with a silicone resin is neopentyl glycol, although other glycols, such as ethylene glycol, propylene glycol, 2-methyl-1,3-propanediol, 2-methyl-2-butyl-1,3-propanediol, 1,2-cyclohexanediol, 1,3-cyclohexandediol, 1,4-cyclohexandediol, 1,4-cyclohexanedimethanol, 1,4-butanediol, 1,5-pentanediol, 1,6-hexandediol and the like, may also be used to form the adduct. Adducts useful in the invention are commercially available, e.g., Morkote® silicone resins. such as Morkote® S-80 sold by Pioneer Plastics, Inc.

The curative for the adduct may be selected from a variety of blocked, multi-NCO functional isocyanates, such as that based on trimerized isophorone diisocyanate. Blocked isocyanates are isocyanates in which the isocyanate groups are reversibly bound to a chemical moiety, which chemical moiety dissociates from the isocyanate groups above a threshold temperature. In the case of coating powders, blocked isocyanates are used in which the threshold temperature for blocking group dissociation is above the processing temperature of the coating powder but below a suitable curing temperature.

Typical blocking groups include, but are not limited to such species as caprolactam and methyl ethyl ketone oxime. A suitable commercial caprolactam-blocked curing agent is Vestagon® B-1530.

Blocked multifunctional isocyanates also include those in which the blocking agent is another isocyanate group. A suitable commerical example is Vestagon® B-154, in which the blocked isocyanate form is a uretdione isocyanate dimer which dissociates to two isocyanates when heated to the deblocking temperature.

The addition of mica and/or calcium metasilicate, aluminum, zinc, and other fillers and/or pigments, applicable to the first embodiment utilizing silicone resin exclusively, is likewise applicable to the second embodiment using a silicone resin adduct plus curative.

Coating powders in accordance with the present invention are formed in a conventional manner. The components of the coating powder are batched and shaken, e.g., for 5 minutes, to blend well. The materials are then extruded, e.g., at 110° C. (230° F.) in a Buss single screw extruder, allowed to cool, chipped, ground and screened to obtain a powder of appropriate size. Average particle size is typically 20–80 microns. Scalping at 100 mesh is typically to remove coarse particles. There is typically about 10% by weight of particles below 10 microns. The amount of material retained on a 325 mesh is typically between about 30 and 50 wt. %. The powder is then applied in a conventional manner, e.g., electrostatically, to a substrate. The substrate is heated at the time of application and/or subsequently so that the coating particles form a continuous film, and, especially in the case of isocyanate-cured silicone resin adducts, effect the cure.

A common white pigment for producing white or light color coatings is titanium dioxide. This is true in coating powders, as well as in other coatings. In organic coating powders, titanium dioxide is conventionally surface-treated with silica ($SiO_2$) aluminum ($Al_2O_3$) or Zirconia ($ZrO_2$) on combinations of these. Such surface treatment in organic coating powders is necessary because when titanium dioxide is irradiated, e.g., when exposed to sunlight outdoors, an activated complex is produced. The activated complex initiates bond breaking in organic polymers encapsulating the pigment, resulting in degradation, over time, of the coating.

Surprisingly, it is found herein, that surface-treated titanium oxide, as is conventionally used in the coating powder art, especially surface-treated titanium dioxide which has a pH less than 7.0 is undesirable for silicone-based coating powders in accordance with the invention. While applicants are not bound by theory, it is believed that the acidic nature of such surface-treated titanium oxide catalyze condensation of the silicone resin such that outgassing of water is at such a rapid rate that bubbles are formed in the coatings as they cure. Thus, when titanium dioxide is used in coating powders of the present invention, surface treatment of the titanium dioxide should be low or of such nature that the pH of a slurry of the titanium oxide (in deionized water) is neutral (pH 7) or slightly basic ($TiO_2$ being basic). Herein th(e test for slurry pH is made by stirring 40 grams of titanium dioxide in 100 grams of deionized water for 30 minutes at 25° C. Essentially, this means the level of silica, alumina, or zirconia or combinations of these should be about 5 wt % or less, down to 0%, relative to the weight of the titanium oxide. Preferably, the pH of the titanium dioxide slurry, as defined above, is 7.3 or above, most preferably 7.5 or above. Titanium dioxide, if used as a primary pigment, is generally used at between about 20 and about 150 phr, most generally between about 40 and about 100 phr relative to the weight of the resin.

While (basic pH) titanium dioxide may be added to compositions as described above which contain mica or calcium metasilicate, compositions in accordance with the invention may contain only silicone and between 20 and 150 phr titanium dioxide, preferably between 40 and about 100 phr. Without the mica and/or calcium metasilicate, the coating formed from the coating composition has less temperature stability. However, where light coatings are to be used, they are useful in applications which would not be subjected to the greatest high temperature extremes because such exposure would tend to discolor such coatings in any case.

The invention will now be described in greater detail by way of specific examples.

EXAMPLE 1 (comparative)

This example illustrates damage caused by high temperature testing to a powder coating outside the scope of the invention based on silicone-ether resin and containing no reinforcing filler.

The components listed under Example 1 in Table 1 below were compounded, chilled, chipped, ground and sieved through a 140 mesh screen in the usual manner to prepare a coating powder. This powder was electrostatically sprayed onto 0.032 inch-thick mild steel panels ("Q" panels) and cured in an oven at 232° C. (450° F.) for 15 minutes. All tests were done on panels with coating thickness of 1.8–2.2 mils. Three tests were performed to evaluate adhesion of the coating at high temperatures: 450° C.–0° C. Thermoshock, 24 h @ 400° C. and 24 h @ 550° C. Descriptions of these tests follow below. The coatings in all three of these tests disbonded dramatically, exposing about 90% of the substrate in the Thermoshock Test, and about 100% in each of the 24 hour tests. These results are recorded in Table 1.

450° C.–0° C. Thermoshock Coated Q-panels were placed in an air circulating oven at 450° C. (842° F.) for 30 minutes, then removed and immediately plunged into an ice-water bath at 0° C. (32° F.). After remaining in the bath for 2 seconds, the panels were removed and allowed to air dry. Panels were evaluated macroscopically for evidence of disbonding.

24 h. 400° C. Coated Q-panels were placed in a static-air muffle furnace at room temperature. The furnace was turned on and allowed to heat over about one hour to 400° C. (752° F.), then allowed to soak at 400° C. for 24 hours. At this time the panels were removed and allowed to cool to room temperature. When cool, the panels were evaluated macroscopically for evidence of disbonding and microscopically for microcracking.

24 h. 550° C. Coated Q-panels were placed in a static-air muffle furnace at room temperature. The furnace was turned on and allowed to heat over about one hour to 550° C. (1022° F.), then allowed to soak at 550° C. for 24 hours. At this time the panels were removed and allowed to cool to room temperature. When cool, the panels were evaluated macroscopically for evidence of disbonding and microscopically for microcraking.

EXAMPLE 2 (comparative)

This example illustrates damage caused by high temperature exposure to a powder coating composition outside the scope of the invention based on a silicone-ether resin and containing 8 parts aluminum flake filler.

The components listed under Example 2 in Table 1 were compounded, chilled, chipped, ground and sieved through a 140 mesh screen in the usual manner to prepare a coating powder. This powder was electrostatically sprayed onto a 0.032 inch thick mild steel "Q" panels and cured in an oven at 232° C. for fifteen minutes. The 450° C.–0° C. Thermoshock Test and the two 24 hour tests were then performed. The coatings in both these tests disbonded dramatically, exposing 100% of the substrate in the Thermoshock Test and about 70% in the 400° C. Test and about 90% in the 550° C. Test. Microcracks in the remaining coatings were evaluated. Cracks were continuous, completely isolating one coating particle or cell from the next. Crack width was typically 30–100 microns. The edges of about 50% of the cells had curled away from the surface. These results are recorded in Table 1.

EXAMPLE 3

This example, within the scope of the invention, illustrates resistance to damage from high temperature testing of a powder coating based on a silicone-ether resin and containing 60 parts 325 HK mica filler.

The components listed under Example 3 in Table 1 were compounded, chilled, chipped, ground and sieved through a 140 mesh screen in the usual manner to prepare a coating powder. This powder was electrostatically sprayed onto a 0.032 inch thick mild steel "Q" panels and cured in an oven at 232° C. for fifteen minutes. The 450° C.–0° C. Thermoshock test and the two 24 hour tests were then performed. Essentially all the coating disbonded in the Thermoshock Test.

Approximately 10% disbonded in the 400° C. Test. The remaining 90% had few microcracks, and what few there were fine and difficult to spot at 70x. This coating would be useful in some applications.

Approximately 95% disbonded in the 550° C. Test. Microcracks on the remaining 5% were characterized. Cracks had an average length of about 300 microns and an average width of about 15 microns. Approximately 30% of the cracks continued from one vertex of a cell to another. About 10% of the cells exhibited edge curling on at least one corner. These results are summarized in Table 1.

EXAMPLE 4

This example, within the scope of the invention, illustrates resistance to high temperature damage of a powder coating based on a silicone resin and containing 60 parts 325 HK mica filler and 8 parts of aluminum flake filler.

The components listed under Example 4 in Table 1 were compounded, chilled, chipped, ground and sieved through a 140 mesh screen in the usual manner to prepare a coating powder. This powder was electrostatically sprayed onto a 0.032 inch thick mild steel "Q" panels and cured in an oven at 232° C. for fifteen minutes. The 450° C.–0° C. Thermoshock test and the two 24 h tests were then performed. Approximately 90% of the coating disbonded in the Thermoshock Test.

Approximately 5% disbonded in the 400° C. Test. This disbonding occurred along the edges where the coating was slightly thicker than usual. No microcracks were, visible in the remaining 95% at 70x. This coating would be useful in some high temperature applications.

Approximately 70% disbonded in the 550° C. Test. Microcracks on the remaining 30% were characterized. Cracks had an average length of about 100 microns and an average width of about 5 microns. Approximately 10% of the cracks continued from one vertex of a coating particle to another. About 10% of the coating particles exhibited edge curling on at least one corner. These results are summarized in Table 1.

EXAMPLE 5

This example illustrates resistance to high temperature damage of a powder coating based on a silicone-ether resin and containing 80 parts 325 HK mica filler.

The components listed under Example 5 in Table 1 were compounded, chilled, chipped, ground and sieved through a 140 mesh screen in the usual manner to prepare a coating powder. This powder was electrostatically sprayed onto a 0.032 inch thick mild steel "Q" panels and cured in an oven at 232° C. for fifteen minutes. The 450° C.–0° C. Thermoshock test and the two 24 h tests were then performed. Approximately 90% of the coating disbonded during the Thermoshock test.

Approximately 2% of the coating disbonded in the 400° C. Test. This disbonding occurred along the edges where the coating was slightly thicker than usual. No microcracks were visible in the remaining 98% at 70x. This coating would be useful in some high temperature applications.

Approximately 20% disbonded in the 550° C. Test. Microcracks on the remaining 80% were characterized. Cracks had an average length of about 30 microns and an average width of about 5 microns. Essentially none of the cracks continued from one vertex of a coating particle to another, nor did any of the coating particles exhibit edge curling. These results are summarized in Table 1.

EXAMPLE 6

This example discloses improved high temperature test performance from a powder coating within the scope of the invention based on a silicone-ether resin and containing 80 parts 325 HK mica filler and 8 parts PF-7130 aluminum flake.

The components listed under Example 6 in Table 1 were compounded, chilled, chipped, ground and sieved through a 140 mesh screen in the usual manner to prepare a coating powder. This powder was electrostatically sprayed onto a 0.032 inch thick mild steel "Q" panels and cured in an oven at 232° C. for fifteen minutes. The coating was then subjected to all three high temperature tests.

In all three tests, the coating remained 100% attached to the surface. However, microscopic examination the panels revealed that the flow of the coating during cure was inadequate to produce a continuous film. Substrate was exposed over at least 50% of the surface. These results are summarized in Table 1. This coating would be useful in some high-temperature applications.

SUMMARY AND CONCLUSION FROM EXAMPLE 1–6

The Thermoshock test did not discriminate well between these coatings. Only the coating of Example 6, which did not form a continuous film passed this test.

The 24 hour test done at 550° C. likewise did not discriminate well between the coatings. Although the degree of disbonding and the size of the microcracks decreased with increasing mica filler, all but Example 6 showed significant disbonding.

The 24 hour test done at 400° C. shows much more clearly the effects cf reinforcing filler. Example 1, with no mica, exhibited complete loss of coating while Example 3 with 60 parts mica retained 90% of its coating, only showing disbonding along the edges where stress concentrations occurred and coatings were thickest. The eight parts of aluminum flake filler in Example composition 4 were effective at eliminating the few microcracks observed in Example 3.

TABLE 1

Components and Test Results

| Component | Ex. 1 | Ex. 2 | Ex. 3 | Ex. 4 | Ex. 5 | Ex. 6 |
|---|---|---|---|---|---|---|
| Morkote S-80 Silicone Resin (Pioneer Plastics, Inc.) | 70 | 70 | 70 | 70 | 70 | 70 |
| Vestagon B-1530 Curing Agent (Hüls America, Inc.) | 30 | 30 | 30 | 30 | 30 | 30 |
| 325 HK Mica Filler (Suzorite Mica Products, Inc.) | — | — | 60 | 60 | 86 | 80 |
| PF-7130 Aluminum filler (Alcan Toyo America) | — | 8.0 | — | 8.0 | — | 8.0 |
| Shepherd Black #1 Pigment (The Sphepherd Color Company) | 15 | 15 | 15 | 15 | 15 | 15 |
| Resiflow P67 Acrylic Flow Aid (GCA Chemical Corporation) | 1.5 | 1.5 | 1.5 | 1.5 | 1.5 | 1.5 |
| Benzoin Degassing Aid (Estron Chemical, Inc.) | 0.8 | 0.8 | 0.8 | 0.8 | 0.8 | 0.8 |
| Coating Appearance | Fair, Craters | Good, Gray | Good | Good, Gray | Good | Good, Rough |
| 60° Gloss | 83 | 29 | 7.0 | 4.5 | 6.2 | 2.6 |
| 450° C.–0° C. Thermoshock (% Disbonded) | 90 | 100 | 100 | 90 | 90 | 0 |
| 24 h, 400° C. Test (Percent Disbonded) | 100 | 70 | 10 (Edge) | 5 (Edge) | 2 | 0 |
| Microcracks | | | | | | |
| Typical Length (Microns) | | C | Few Cracks | No Cracks | No Cracks | No Cracks |
| Typical Width (Microns) | — | 30–100 | | | | |
| Crack Continuity (%)[1] | | 100 | | | | |
| Cell Edge Curling (%)[2] | | 50 | | | | |
| 24 h, 550° C. Test (Percent Disbonded) | 100 | 90 | 95 | 70 | 20 | 0 |
| Microcracks | | | | | | |
| Typical Length (microns) | — | C | 300 | 100 | 30 | No Cracks |
| Typical Width (microns) | | 30–100 | 15 | 5 | 5 | |
| Crack Continuity (%)[1] | | 100 | 30 | 10 | 0 | |
| Cell Edge Curling (%)[2] | | 50 | 10 | 10 | 0 | |

[1]Percent of cracks which extend from one cell vertex to another. Cells had 4–6 vertices.
[2]Percent of cells which had curled away from the substrate on at least one vertex or side.

EXAMPLE 7 (comparative)

This example, outside the scope of the present invention, illustrates damage caused by high temperature exposure to a coating based on a silicone resin and containing no filler.

The components listed under Example 7 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes, giving a coating with a poor, grainy appearance full of bubbles and seeds.

When the 450° C.–0° C. Thermoshock and 24 h, 550° C. tests were performed, the coating failed dramatically, with disbonding over essentially the entire surface. These results are recorded in Table 2.

EXAMPLE 8 (comparative)

This example, outside the scope of the present invention, illustrates performance of silicone coatings with low levels of mica reinforcing fillers.

The components listed under Example 8 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes. The 450° C.–0° C. Thermoshock and 24 h, 550° C. test were then performed. About 40% of the substrate disbonded in the Thermoshock test and about 10% in the 550° C. Test. Microcracks in the remaining 90% of the coating were evaluated. Crack width was about 15 microns. Cracks were continuous, completely isolating one particle or cell of coating from the next. The edges of essentially all the coating particles had curled away from the surface. These results are recorded in Table 2.

EXAMPLE 9

This example illustrates performance of silicone coatings with marginal levels of mica reinforcing fillers, but within the scope of the present invention.

The components listed under Example 9 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes. The 450° C.–0° C. Thermoshock and 24 h, 550° C. test were then performed. About 40% of the substrate disbonded in the Thermoshock test and less than 1% in the 550° C. Test. Microcracks were continuous in length, completely isolating one cell from the next. Crack width was about 15 microns. The edges of about 30% of the coating particles had curled away from the surface. These results are recorded in Table 2. The coating of this example, and of Examples 10–15, would be useful for some high temperature applications.

EXAMPLE 10

This example illustrate performance of silicone coatings with moderate levels of mica reinforcing fillers, within the scope of the present invention.

The components listed under Example 10 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes, giving a coating with a mottled, poor appearance, with bubbles and seeds.

The coating passed the 450° C.–0° C. Thermoshock and 24 h, 550° C. tests, maintaining adhesion over the entire surface. Microcracks ranged from 200 to 400 microns in length, averaging about 300; were about 15 microns in width, and were largely joined into continuous cells, approximately 30% of cracks extending over more than one vertex. About 10% of cells showed edge curling. These results are recorded in Table 2.

EXAMPLE 11

This example illustrate performance of silicone coatings with high levels of mica reinforcing fillers, within the scope of the present invention.

The components listed under Example 11 in Table 2 were compounded, chilled, chipped, to ground and sieved through a 140 mesh screen in the usual manner to prepare a coating powder. This powder was electrostatically sprayed onto 0.032 inch-thick mild steel "Q" panels and cured in an oven at 232° C. for fifteen minutes, giving a coating with a mottled but fair appearance.

The coating passed the 450° C.–0° C. Thermoshock and 24 h, 550° C. tests, maintaining adhesion over the entire surface. Microcracks ranged from 50 to 200 microns in length, averaging about 100; and were about 10 microns in width. About 10% of cracks spanned more than one vertex. About 10% of the cells exhibited edge curling. These results are recorded in Table 2.

EXAMPLE 12

This example, within the scope of the present invention, illustrates performance of silicone coatings with high levels of mica reinforcing fillers. This example also shows the poor resistance to corrosive salt fog environments after heat exposure of coatings containing no zinc.

The components listed under Example 12 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes, giving a coating with a smooth, even appearance.

The coating passed the 450° C.–0° C. Thermoshock and 24 h, 550° C. tests, maintaining adhesion over the entire surface. Microcracks ranged from 50 to 200 microns in length, averaging about 100; and were about 10 microns in width. About 30% of cracks spanned more than one vertex. None of the cells exhibited edge curling. These results are recorded in Table 2. These results are recorded in Table 2.

In addition to these tests, the corrosion resistance of the heat-aged coating was tested by the Salt Fog Corrosion Test (ASTM B-117). In preparation for this test panels were subjected to one 450° C.–0° C. thermoshock cycle, with a total exposure in the 450° C. oven of 30 minutes. Cooled panels were then cut with one vertical scribe to the substrate, and then suspended in an atmosphere of neutral salt fog at 35° C. (95° F.) for 168 hours. After the test the panels were observed to have no significant undercutting of the coating along the scribe. However, the unscribed portions of the panel contained many medium #8 blisters with red rust seeping from those blisters.

EXAMPLE 13

This example, within the scope of the present invention, illustrates performance of silicone coatings with high levels of mica reinforcing fillers. This examples also shows improved resistance to corrosive salt fog environments after heat exposure provided by active metal powders such as zinc powder.

The components listed under Example 13 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes, giving a coating with a smooth, even, low gloss appearance.

The coating passed the 450° C.–0° C. Thermoshock and 24 h, 550° C. tests, maintaining adhesion over the entire surface. Microcracks ranged from 50 to 200 microns in length, averaging about 100; and were about 5 microns in width. About 10% of cracks spanned more than one vertex. No edge-curling was observed. These results are recorded in Table 2.

In addition to these tests, the corrosion resistance of the heat-aged panels. of this coating were tested as follows: First, test panels were subjected to one 450° C.–0° C. thermoshock cycle, with a total exposure in the 450° C. oven of 30 minutes. Then they were tested according to the Salt Fog Corrosion Test (ASTM B-117). Panels were cut with one vertical scribe to the substrate, and then suspended in an atmosphere of neutral salt fog at 35° C. for 168 hours. Afterward, the test the panels were observed to have no significant undercutting of the coating along the scribe. No effects were seen on the unscribed portions of the panels.

EXAMPLE 14

This example illustrate performance of silicone coatings with very high levels of mica reinforcing fillers.

The components listed under Example 14 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes, to a fair coating with a rough appearance and isolated points where the substrate was not completely covered.

The coating passed the 450° C.–0° C. Thermoshock and 24 h, 550° C. tests, maintaining adhesion over the entire surface. Microcracks ranged from 50 to 200 microns in length, averaging about 100; and were about 5 microns in width. About 10% of cracks spanned more than one vertex. No edge-curling was observed. These results are recorded in Table 2.

EXAMPLE 15

This example illustrate performance of silicone coatings with high levels of mica reinforcing fillers, in combination with aluminum flake reinforcing filler.

The components listed under Example 15 in Table 2 were compounded, chilled, chipped, ground and sieved through a 140 mesh screen in the usual manner to prepare a coating powder. This powder was electrostatically sprayed onto 0.032 inch-thick mild steel "Q" panels and cured in an oven at 232° C. for fifteen minutes, giving a gray coating with a smooth, even appearance.

The coating passed the 450° C.–0° C. Thermoshock and 24 h, 550° C. tests, maintaining adhesion over the entire surface. Microcracks ranged from 20 to 50 microns in length, averaging about 30; were about 5 microns in width. Cracks did not extend from one vertex to another. No edge curling was observed. These results are recorded in Table 2.

SUMMARY AND CONCLUSION FROM EXAMPLE 7–15

Taken together, Examples 7, 8, 9, 10, 11, 12 and 14 show the typical behavior of the coating as more reinforcing filler such as mica is added. When no reinforcing filler is present, or where there are low levels, for example, below about 40 phr mica, resistance to beat aging and thermoshock events is low. The coatings fail with extensive delamination. At moderate to high levels of reinforcing fillers, for example, about 40 or more phr mica, coatings resist delamination with reducing severity of microcracking as levels of reinforcing fillers increase.

reinforcing fillers such as mica. It should be present in 2–12 phr, preferably 6–10 phr.

The addition of an active metal, such as zinc, improves the corrosion resistance of coatings which have been subjected to high temperatures. Levels between 10 and 300 phr are useful. Levels between 50 and 200 phr are especially useful.

TABLE 2

Components and Test Results

| Component | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|
| 6-2230 Pheny Methyl Silicone Resin (Dow Corning) | 100 | 100 | 100 | 100 | 100 | 100 | 100 | 100 | 100 |
| 325 HK Mica Filler (Suzorite Mica Products, Inc.) | — | 20 | 40 | 60 | 80 | 100 | 100 | 120 | 80 |
| Shepherd Black #1 Pigment (The Shepherd Color Company) | 15 | 15 | 15 | 15 | 15 | 15 | 15 | 15 | 15 |
| Zinc acetylacetonate (GCA Chemical Corp.) | 0.1 | 0.1 | 0.1 | 0.1 | 0.1 | 0.1 | 0.1 | 0.1 | 0.1 |
| Benzoin (Estron Chemicals, Inc.) | 0.8 | 0.8 | 0.8 | 0.8 | 0.8 | 0.8 | 0.8 | 0.8 | 0.8 |
| Resiflow P-67 (GCA Chemical Corporation) | 1.5 | 1.5 | 1.5 | 1.5 | 1.5 | 1.5 | 1.5 | 1.5 | 1.5 |
| Zinc Dust 64 (Zinc Corporation of America) | — | — | — | — | — | — | 50 | — | — |
| PF-7130 Aluminum Filler (Alcan Toyo America) | — | — | — | — | — | — | — | — | 8 |
| Coating Appearance[1] | Poor B, S, G | Poor B, S | Poor B, S | Poor B, S, M | Fair M | Good | Good | Fair R | Good, Gray |
| 60° Gloss | 48.4 | 26 | 27 | 20.7 | 11.5 | 6.6 | 2.6 | 2.7 | 8 |
| 450° C.–0° C. Thermosh. (Percent Disbonded) | 100 | 40 | 40 | 0 | 0 | 0 | 0 | 0 | 0 |
| 24 h, 550° C. Test (% Disbonded) | 100 | 10 | <1 | 0 | 0 | 0 | 0 | 0 | 0 |
| 24 h, 550° C. Test Microcracks | — | | | | | | | | |
| Typical Length (microns) | | C[2] | C | 300 | 100 | 100 | 100 | 100 | 30 |
| Typical Width (microns) | | 30 | 15 | 15 | 10 | 10 | 5 | 5 | 5 |
| Crack Continuity (%)[3] | | 100 | 100 | 30 | 10 | 30 | 10 | 10 | 0 |
| Cell Edge Curling (%)[4] | | 100 | 30 | 10 | 10 | 0 | 0 | 0 | 0 |
| Salt Fog Corrosion Testing[5] | — | — | — | — | — | B-8 R | NC | — | — |

[1]Coating Appearance:
B = Bubbles
G = Grainy
M = Mottled
R = Rough
S = Seeds
[2]Microcracks:
C = Cracks are continuous, 100% joined from vertex to vertex, completely isolating the cells.
[3]Percent of cracks which extend from one cell vertex to another. Cells had 4–6 vertices.
[4]Percent of cells which had curled away from the substrate on at least one vertex or side.
[5]Salt Fog Corrosion Testing:
B-8 = Size No. 8 blisters
R = Seeping red rust
NC = No change Corrosion resistance after high temperature exposure improves when active metals such as zinc is included in the coating. Aluminum flake in conjunction with reinforcing fillers such as mica further minimizes microcracking.

OVERALL CONCLUSIONS

A reinforcing filler, such as mica and/or calcium metasilicate, is necessary to achieve high temperature resistance including resistance to delamination and microcracking. Mica and/or calcium metasilicate reinforcing is useful from about 40 phr upward, particularly upward to about 140 phr, preferably 60 to 120 phr, more preferably about 80 to 100 phr. Aluminum flake is useful in combination with other

EXAMPLE 16–21

Various grades of TiO$_2$ pigment listed in Table 3 were used to prepare coatings. Vendor-supplied data concerning the type and amount of surface treatment on each pigment is included as is slurry (in deionized water) pH data.

TABLE 3

TiO$_2$ Pigments

| Pigment | Manufacturer | Surface Treatment (Wt. %) | Surface Treatment Type | Slurry pH |
|---|---|---|---|---|
| R-960 TiO$_2$ Pigment | Dupont | 11 | SiO$_2$/Al$_2$O$_3$ | 6.04 |
| R-902 TiO$_2$ Pigment | Dupont | 9 | SiO$_2$/Al$_2$O$_3$ | 6.7 |
| TR-93 TiO$_2$ Pigment | Tioxide | 7 | SiO$_2$/Al$_2$O$_3$ | 6.7 |
| R-101 TiO$_2$ Pigment | Dupont | 3 | Al$_2$O$_3$ | 7.97 |

Examples 16–19 were formulated as per Table 4 below:

TABLE 4

| | Compositions | | | | | |
|---|---|---|---|---|---|---|
| Component | 16(c) | 17(c) | 18(c) | 19 | 20 | 21 |
| Dow-Corning 6-2230 Silicone Resin | 100 | 100 | 100 | 100 | 100 | 100 |
| Zinc Acetylacetonate | 0.5 | 0.5 | 0.5 | 0.5 | 0.4 | 0.5 |
| Benzoin | 0.8 | 0.8 | 0.8 | 0.8 | 0.8 | 0.7 |
| Resiflow P-67 | 1.5 | 1.5 | 1.5 | 1.5 | 1.5 | 1.5 |
| R-960 TiO$_2$ | 40 | — | — | — | — | — |
| R-902 TiO$_2$ | — | 40 | — | — | — | — |
| TR-93 TiO$_2$ | — | — | 40 | — | — | — |
| R-101 TiO$_2$ | — | — | — | 40 | 50 | 100 |
| C-3000 Mica | 40 | 40 | 40 | 40 | — | — |
| Nyad 400 Calcium Metasilicate | — | — | — | — | 70 | — |

| | Comparative Examples | | | Examples | | |
|---|---|---|---|---|---|---|
| Properties | 16(c) | 17(c) | 18(c) | 19 | 20 | 21 |
| Appearance | Heavy Foaming | Foaming | Light Foaming | No Foaming | No Foaming | No Foaming |

Variations in TiO$_2$ Pigment

Comparative Examples 16–18 and Examples 19–21 show the effect of varying the level of pigment surface. They show the progressive improvement seen as the TiO$_2$ fraction goes up, the level of surface treatment goes down and the pH goes up (basic). Comparative Examples 16–18 show the poor results to be expected from TiO$_2$ pigments with levels of surface treatment that are too high and with pH's which are too low (too acidic). Example 19 shows the good results produced by TiO$_2$ pigments with low enough levels of surface treatment and high enough pH.

COMPARATIVE EXAMPLE 16

The components listed under Comparative Example 16 in Table 4, including R-960 TiO$_2$, were compounded, chilled, chipped, ground and sieved through a 140 mesh screen in the usual manner to prepare a white coating powder. This powder was electrostatically sprayed onto 0.032 inch-thick mild steel panels "Q" panels and cured in an oven at 450° F. for 10 minutes. The properties were measured on panels on which the coating was 1.8 to 2.5 mils thick. The pigment in this coating had an 11% surface treatment, a pH of 6.04, and gave a bubbly foamy coating.

COMPARATIVE EXAMPLE 17

The components listed under Comparative Example 17 in Table 4, including R-902 TiO$_2$, were compounded, chilled, chipped, ground and sieved through a 140 mesh screen in the usual manner to prepare a white coating powder. This powder was electrostatically sprayed onto 0.032 inch-thick mild steel panels "Q" panels and cured in an oven at 450° F. for 10 minutes. The properties were measured on panels on which the coating was 1.8 to 2.5 mils thick. The pigment in this coating had a 9% surface treatment pH of 6.7, and gave a bubbly foamy coating.

COMPARATIVE EXAMPLE 18

The components listed under Comparative Example 18 in Table 4, including TR-93 TiO$_2$, were compounded, chilled, chipped, ground and sieved through a 140 mesh screen in the usual manner to prepare a white coating powder. This powder was electrostatically sprayed onto 0.032 inch-thick mild steel panels "Q" panels and cured in an oven at 450° F. for 10 minutes. The properties were measured on panels on which the coating was 1.8 to 2.5 mils thick. The pigment in this coating had an 7% surface treatment a pH of 6.7, and gave a coating that contained bubbles, but was less foamy than that of Comparative Examples 16 and 17.

EXAMPLE 19

The components listed under Example 19 in Table 4, including R-101 TiO$_2$, were compounded, chilled, chipped, ground and sieved through a 140 mesh screen in the usual manner to prepare a white coating powder. This powder was electrostatically sprayed onto 0.032 inch-thick mild steel panels "Q" panels and cured in an oven at 450° F. for 10 minutes. The properties were measured on panels on which the coating was 1.8 to 2.5 mils thick. The pigment in this coating had no silica or alumina surface treatment, and gave a coating that was free of bubbles except in areas around the edges greater than 5.0 mils thick.

EXAMPLE 20

The components listed under Example 20 in Table 4, including R-101 TiO$_2$, were compounded, chilled, chipped, ground and sieved through a 140 mesh screen in the usual manner to prepare a white coating powder. This powder was electrostatically sprayed onto 0.032 inch-thick mild steel panels "Q" panels and cured in an oven at 450° F. for 10 minutes. The properties were measured on panels on which the coating was 1.8 to 2.5 mils thick. The coating was free of bubbles.

EXAMPLE 21

The components listed under Comparative Example 21 in Table 4, including R-101 TiO$_2$, were compounded, chilled, chipped, ground and sieved through a 140 mesh screen in the usual manner to prepare a white coating powder. This powder was electrostatically sprayed onto 0.032 inch-thick mild steel panels "Q" panels and cured in an oven at 450° F. for 10 minutes. The properties were measured on panels on which the coating was 1.8 to 2.5 mils thick. The coating was free of bubbles.

What is claimed is:

1. A coating powder consisting essentially of
   A) 100 parts silicone resin having a glass transition temperature of at least about 45° C., and
   B) between about 20 and about 150 phr titanium dioxide, wherein said titanium dioxide is non-coated or is coated with heat-stable oxides such that when 40 grams of said titanium dioxide is stirred in 100 grams deionized water at 25° C. for 30 minutes, the pH of said slurry is 7 or above.

2. The coating powder of claim 1 further comprising
   C) at least about 40 parts per hundred resin by weight (phr) of a filler selected from the group consisting of mica, calcium metasilicate, and mixtures thereof.

3. The coating powder according to claim 1 containing at least about 60 phr mica and/or calcium metasilicate.

4. The coating powder according to claim 1 containing at least about 80 phr mica and/or calcium metasilicate.

5. The coating powder according to claim 1 further containing between about 1 and about 20 phr particulate aluminum metal.

6. The coating powder according to claim 1 further containing between about 2 and about 12 phr particulate aluminum metal.

7. The coating powder according to claim 1 further containing between about 6 and about 10 phr particulate aluminum metal.

8. The coating powder according to claim 1 further containing at least about 10 phr zinc metal.

9. The coating powder according to claim 1 further containing at least about 50 phr zinc metal.

10. The coating powder according to claim 1 wherein said silicone resin has organic substitutents selected from the group consisting of phenyl, methyl, $C_2$ through $C_6$ alkyl and mixtures thereof; a viscosity of between about 500 and about 10,000 cps at 150° C.; a condensable hydroxyl content of between about 2.0 and about 4.5 wt %; and a glass transition temperature of about 55° C. or above.

11. The coating powder according to claim 10 wherein said silicone resin has about 0.2% or less of organic solvent.

12. A substrate having a coating formed from the coating powder of claim 1.

* * * * *